Dec. 12, 1972 K. R. GRICE, JR., ET AL 3,706,027
MATERIALS COUNTING SYSTEM UTILIZING PERMANENT MAGNETS
AND THEIR ASSOCIATED FIELDS
Original Filed June 10, 1969 2 Sheets-Sheet 1

INVENTORS
KARL R. GRICE, JR.
DAN M. EDWARDS,
BY
Berman, Davidson & Berman
ATTORNEYS.

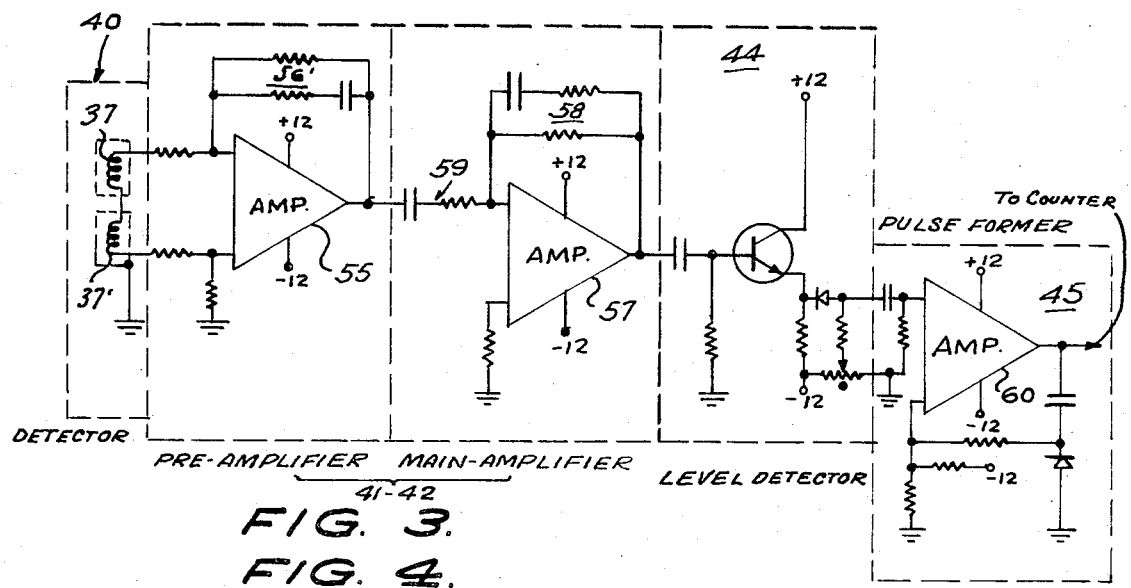
FIG. 3.
FIG. 4.
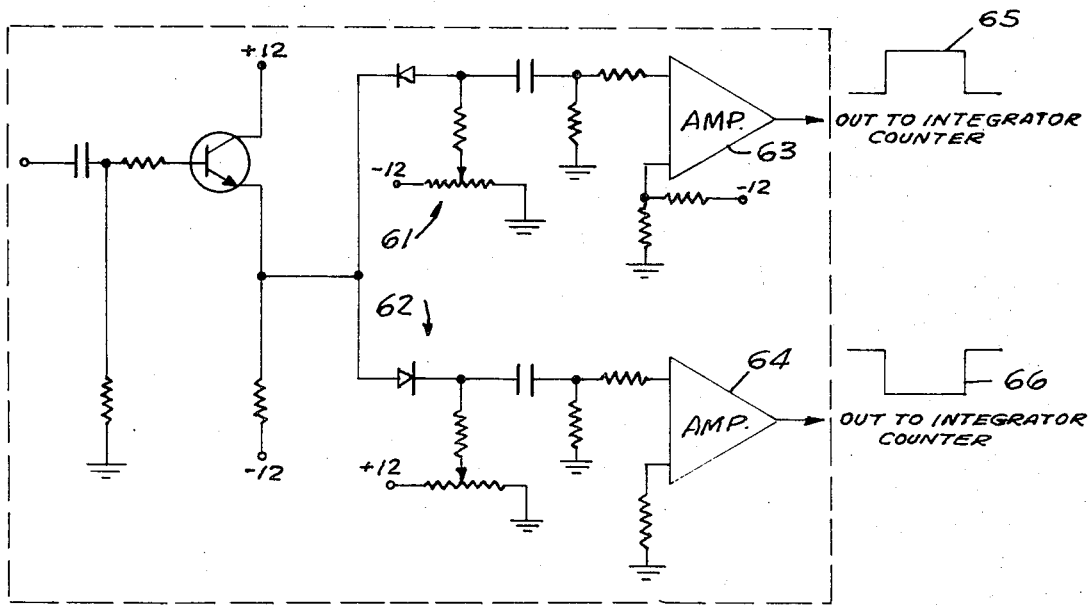
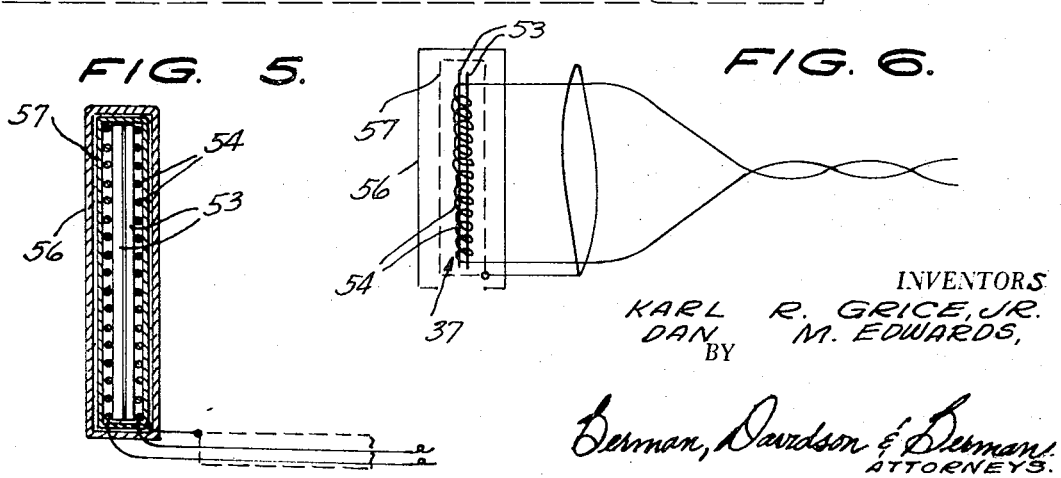
FIG. 5.
FIG. 6.
INVENTORS
KARL R. GRICE, JR.
DAN M. EDWARDS,
BY
Berman, Davidson & Berman
ATTORNEYS.

3,706,027
Patented Dec. 12, 1972

3,706,027
MATERIALS COUNTING SYSTEM UTILIZING PERMANENT MAGNETS AND THEIR ASSOCIATED FIELDS
Karl R. Grice, Jr., P.O. Box 1169, Anderson, S.C. 29621, and Dan M. Edwards, 110 Blackland Road NW., Atlanta, Ga. 30305
Continuation of abandoned application Ser. No. 831,953, June 10, 1969. This application July 13, 1971, Ser. No. 162,275
Int. Cl. G01r 33/00
U.S. Cl. 324—34 R
6 Claims

ABSTRACT OF THE DISCLOSURE

A system for counting pieces of laundry, or the like, by attaching a permanent magnet to each piece and passing the pieces through a conveyor with a magnetic field detector mounted thereon to generate pulses corresponding to the pieces as they pass by; the pulses are counted by a counter circuit arranged to utilize the signals only if their strength exceeds a predetermined lower threshold value and do not exceed a predetermined upper limit value; in one embodiment the system is designed to utilize a signal determined by an interval of time in the vicinity of maximum detected field rather than the total signal received.

---

This is a continuation of application Ser. No. 831,953, filed June 10, 1969, and now abandoned.

This invention relates to systems for counting materials, fabrics, fabric lots, clothing, or the like, and more particularly to systems for counting soiled fabrics as they may be encountered in laundries, dry cleaning facilities, diaper or linen services, textile plants, or the like, through the use of permanent magnets embedded, or implanted, in the pieces.

Counting systems which are based upon the separation of individual items for counting are well-known. In a typical common system heretofore employed, a photoelectric cell and a lamp source are utilized. After each item has been separated from its constituent mass, the item is placed on a conveyor system where it passes between the photoelectric cell and the illuminating source. Interruption of the light beam causes the item to be automatically counted through the use of electronic and/or electrical impulses counters.

More elaborate schemes have been devised for the counting of opaque items. Some of the systems heretofore employed use ultrasonic vibrations, dielectric field changes, and changes in the inductance or resistance of a coil producing an electromagnetic field as the basis for counting.

The present invention is based on the use of a magnetic field emanating from a permanent magnet which has previously been implanted in or on the sample item. A counting system employing the magnetic field from such a permanent magnet has definite advantages over other types of systems. Among these advantages are the following:

(1) The permanent magnet employed displays a magnetic field spontaneously and independently of ordinary environmental influences, such as temperature, humidity, and pressure.
(2) The field penetrates the confines of the material or medium in which it is implanted with negligible attenuation or distortion.

In addition, the magnet can be made physically small, requires no external or internal stimulants for detection, such as power supplies, oscillators, or the like, and it can readily be detected and isolated in the presence of non-ferrous materials or ferrous materials which do not display a magnetic field of the same order of magnitude, or have not been magnetized.

Furthermore, the magnetic field can be readily varied in magnitude to cover a large range of materials, substances, and detection distances, and the magnet, itself, can be easily fabricated in different form factors which will allow it to blend with its implanted medium. Also, the material, or item, to which the magnet is attached can be counted in the presence of other like, or unlike materials or items. It can be counted in bulk without contact, thereby relieving the user of the task of separation before counting.

Accordingly, it is a principle object of the invention to provide a system of the type described having the above-mentioned characteristics and advantages.

A further object of the invention is to provide an accurate and relialbe counting system which can be installed in a minimal amount of space.

A still further object of the invention is to provide a system of the foregoing type which produces a count indication only when the detected magnetic field exceeds a predetermined threshold value.

A still further object of the invention is to provide a system of the foregoing type which ignores counting an item unless the magnetic field detected exceeds a predetermined value.

A still further object of the invention is to provide a system of the foregoing type in which a minimal magnetic field is required.

A still further object of the invention is to provide a system of the foregoing type which counts the various implanted magnets, and thus, the item, at a predetermined velocity.

A still further object of the present invention is to provide a system of the foregoing type which will count objects with minimal separation distance between implanted magnets.

Further objects and advantages of the invention will become apparent from the following description and claims, and from the accompanying drawings, wherein:

FIG. 3 is an electrical wiring diagram showing the electrical connections of the various input stages and the pulse-forming stage of a system such as that illustrated diagrammaticlly in FIG. 2.

FIG. 4 is a partial electrical wiring diagram showing a modification of a portion of the circuit of FIG. 3, in accordance with the present invention.

FIG. 5 is a cross-sectional view, to an enlarged scale, showing the construction of a detector coil unit which may be employed in a counting system according to the present invention.

FIG. 6 is a schematic diagram of a detector coil unit such as that illustrated in FIG. 5.

Figure 1:
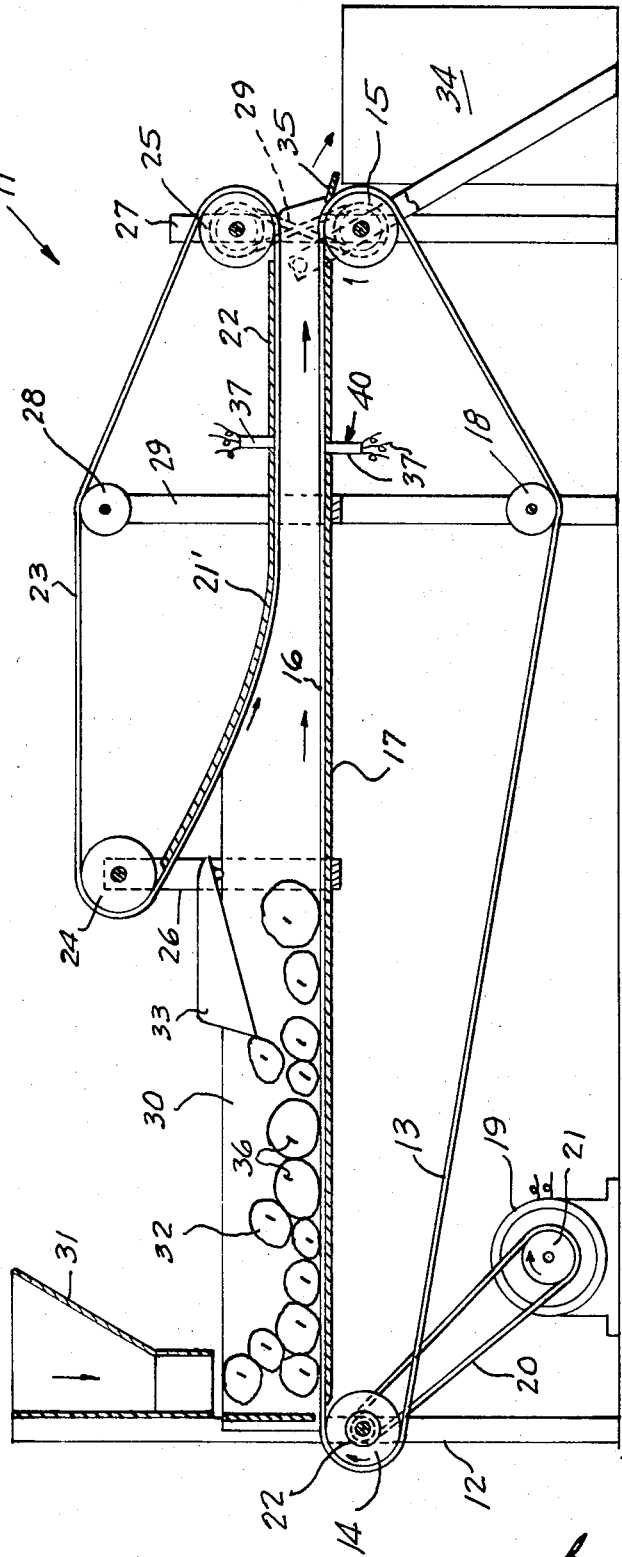
FIG. 1 is a longitudinal vertical cross-sectional view taken through a typical article-counting apparatus constructed in accordance with the present invention.

Referring to the drawings, 11 generally designates a typical installation which may be employed as a counting system in accordance with the present invention. Thus, the system includes a main supporting frame 12 on which is mounted a conveyor belt 13 which is supported by the front and rear rollers 14 and 15 transversely-journaled in the frame 12, defining the top run 16 which extends horizontally along the frame and which is supported on a horizontal plate member 17 rigid with the frame. As shown in FIG. 1, the top run 16 extends longitudinally of frame 12 and is slidably-supported on the longitudinally-extending, horizontal plate member 17. The conveyor belt has a bottom run which is engaged by a transverse tension roller 18 at the lower intermediate part of the frame, as is clearly shown in FIG. 1. Conveyor belt 13 is driven by an electric motor 19 mounted subjacent the forward and portion of supporting surface 17, the motor being drivingly-coupled to the front roller 14, as by a drive belt 20. The belt 20 is engaged on respective pulleys 21 and 22 provided on the shaft of motor 19 and the shaft of roller 14.

Mounted on the rear portion of the frame 12 and extending transversely thereof is an upper guide plate 21' which is arcuately-curved at its forward portion and converges toward the top run 16 of conveyor belt 13, the rear portion of the guide plate 21' being horizontal and extending parallel to the rear portion of the top run 16, the horizontally-extending rear portion of guide plate 21' being shown at 22. An endless upper conveyor belt 23 is engaged around respective end rollers 24 and 25, the forward end roller 24 being carried on upright supports 26 rigidly-secured to frame 12 at the intermediate portion thereof, and the rear roller 25 being journaled on uprights 27 provided at the rear end of frame 12, the roller 25 being located above the rear roller 15 associated with the lower conveyor belt 13. The top run of the endless belt 23 is supported on a tensioning roller 28 transversely-journaled on uprights 29 forming part of frame 12, the bottom tensioning roller 18 being likewise transversely-journaled between the uprights 29. The lower run of belt 23 is slidably-engaged against the guide plate 21' so that it converges rearwardly in the same manner as said guide plate. The rear roller 25 is drivingly-coupled to the rear roller 15 associated with bottom conveyor belt 13, as by a coupling drive belt 29, the drive belt 29 being reversed, namely, having a figure-8 configuration as shown in FIG. 8, so that the lower run of endless belt 23 travels in the same direction as the upper run 16 of endless belt 13, and at the same speed. Thus, the lower run of belt 23 and the upper run 16 of belt 13 travel rearwardly at the same speed.

The frame 12 is provided with longitudinal upstanding walls 30 adjacent the respective side edges of the conveyor belt, thereby defining an enclosure for receiving articles therebetween and whereby the articles are guided rearwardly on the moving top run 16 of endless belt 13. An article-receiving chute, or hopper 31 is provided at the forward end of frame 12 in a position adapted to receive articles 32 and to guide them downwardly onto the forward end of top run 16 of the endless conveyor belt 13. Designated at 33 is an article-leveling member which is secured between the uprights 26 and which projects forwardly, as illustrated in FIG. 1, the member 33 being of any suitable shape, for example, being triangular in cross-sectional shape, as shown in FIG. 1, and projecting generally downwardly and forwardly, as illustrated, so that its lower transverse edge is engageable with articles 32 so as to suitably distribute the articles as they are carried on the top run 16 of endless conveyor belt 13 so that the articles are not excessively stacked as they enter the convergent space between the arcuate forward end portion of plate 21' and the top run 16 of belt 13. Thus, the control member 33 prevents excessive crowding of the articles 32 as they pass between the endless belts 13 and 23 and facilitates accurate counting of the articles.

The rear end of the assembly is provided with an article-receiving container 34 positioned subjacent a downwardly and rearwardly-inclined end apron 35 provided on frame 12 in a position immediately rearwardly of top run 16 of the conveyor belt 13 and acting to guide articles emerging from between the conveyor belts so that the articles fall into the container 34.

As previously-mentioned, small permanent magnets 36 are attached in any suitable manner to each of the articles 32. For example, the magnets may be in the form of labels, or may be merely encased in layers of material of the article carrying the magnet.

The assembly 11 is provided with detection means, for example, top and bottom detection coil assemblies 37, 37' respectively mounted on the plate member 21' and the plate member 17 in vertical registry, as shown in FIG. 1, and located at the intermediate portion of the space defined between the parallel elements 22 and 17. Thus, the articles 32 are compressed in a convergent forward space between plate members 21' and 17, and the compressed articles are then passed through the rear portion of the space, passing the detection coils 37, 37'.

Thus, the articles 32 are fed randomly to the conveyor belts through the hopper 31. The lower conveyor belt 13 conveys the articles, carrying them below the control member 33 which spreads them out, so that eventually the suitably distributed articles move into the space between the arcuate forward portion of plate 21' and plate 17. This defines a compression compartment which provides gradual compression of the articles until reaching a predetermined set compression level at which the articles are held as they pass into the space between the horizontal parallel elements 22 and 17, thereby passing between the detector coils 37, 37'. As above-mentioned, the upper and the lower belts are driven at the same velocity and, therefore, the articles pass the detector coils 37, 37' at this velocity, which is known and constant. After the articles pass the detector coil assemblies 37, 37', they are deposited in the receiving container 34 at the end of the conveyor system for further disposition. At this point, all the articles have been detected by the detection coil assemblies 37, 37', and have been counted by the associated circuit means, presently to be described, and diagrammatically illustrated, for example, in FIG. 2.

The counting system of the present invention depends upon the labeling of items or materials with a source of magnetic energy. Item counting is accomplished by detecting this source as it passes the detector assemblies. Detection is a function of the strength of the magnetic field and the sensitivity of the field detection means. In one embodiment of the invention, presently to be described, counts are registered when the magnetic field detected by the field detection means exceeds a predetermined threshold value, it being apparent that the term "count" as used herein denotes passage of a magnet within a specified distance of the detection means, and not necessarily an actual contact of the magnet with said detection means. In accordance with one embodiment of the invention, counts may be transmitted to a remote indicator. Such information may also be indicated visually at the actual conveyor station.

According to the present invention, counts are registered when the magnetic field detected by the field detection means exceeds a predetermined threshold value. As an embodiment of the invention, the system may be designed to utilize a signal determined by an interval of time in the vicinity of maximum detected field rather than the total signal received.

Figure 2:
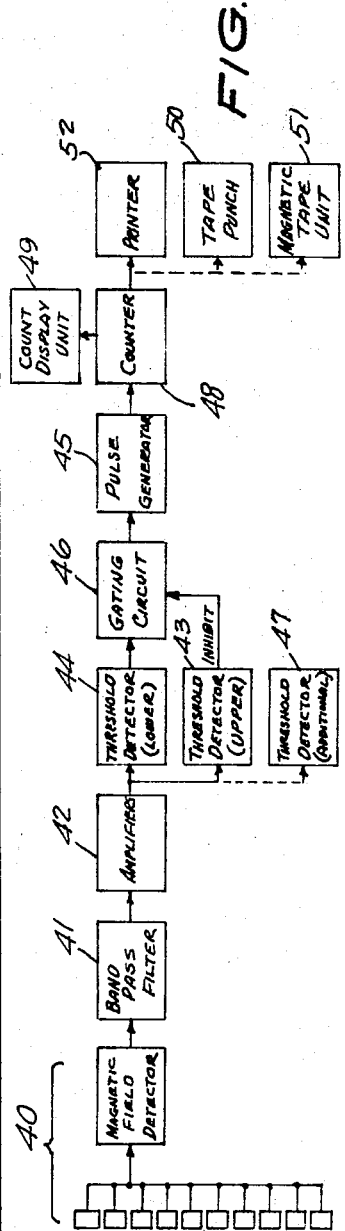
FIG. 2 is a block diagram of a practical form of the invention, showing the various electrical components involved in the counting system.

FIG. 2 diagrammatically illustrates, in block form, the electronic components of a counting system according to the present invention. Thus, the field detection means is designated generally at 40, and may comprise, for example, a pair of detection coil assemblies 37, 37' as illustrated in FIG. 1, or any other suitable array of magnetic field detection means, as will be presently described. As above-mentioned, the articles 32 to be counted may be heterogeneous in nature, and may have a wide range of sizes, for example, may comprise baby diapers, towels, bundles of towels, sheets or groups of sheets, articles of clothing, including pants, shirts, undergarments, jackets, or the like. Each article is provided with a source of permanent magnetic energy, for example, a small permanent magnet 36 secured thereto or enfolded therein. The amount of energy which is required for each article is very small. The magnet 36, as above-mentioned, may be attached to the article in the form of a label, or may be enfolded in layers of the material of the article.

The electronic system shown diagrammatically in FIG. 2 may be located physically on the frame 12, or its major portions may be located remote from the frame, with only the magnetic field detection means 40 (37, 37' in FIG. 1) mounted on the frame.

The detection means 40 is preferably of the type having omnidirectional detection capability and having a sensitivity pattern such as to produce output information in accordance with the full value of the magnetic field, or the rate of change of the magnetic field as it passes the detection means. Output information, as here employed, refers to an electrical signal, an electron beam deflection, or other analogs which may represent the passage of the magnetic field. During the passage of the magnetically-labeled article, or material, the magnetic lines of force surrounding the magnet 36 carried thereby impinge on the sensitive area of the detection means, causing a voltage to be induced, in the case of a coil-type detection means, or causing a beam deflection in an electron-beam detector, such as a cathode ray tube, if such is employed as the magnetic field detection means.

Where the detection means is a coil of wire, or system of coils, the output voltage generated therein is applied directly through a band-pass filter 41 to an amplifier 42 for amplification. Where the magnetic field detection means is an electron beam, the deflection of the beam is detected, using a photosensitive device which monitors a phosphor on the screen of the electron beam device, and which converts the beam displacement to an electrical signal which is then applied to the amplifier 42.

The signals from the amplifier 42 are sorted into two amplitude levels by the upper and lower threshold detectors 43 and 44. An output from the lower level threshold detector 44 is passed onto a pulse generator 45 which is triggered by the signal to produce a pulse of predetermined amplitude and width. Should the upper threshold level, defined by the upper threshold detector 43, also be exceeded by the signal from the amplifier, the resultant output of the upper threshold detector 43 may be employed to inhibit application of the lower level detector output to the pulse generator by the use of an electronic gating circuit 46 of conventional design.

In addition, the output of the upper threshold detector 43 may be used to classify the articles passing the sensitive detector stage 40 into different categories other than that represented by the lower threshold detector 44, whereby the apparatus may be employed as an article-separating device in accordance with the present invention. Additional threshold detectors 47 may be added to further categorize the input signals and thus, the articles. Each is categorized by a respective permanent magnet label of specific and predetermined field strength and size.

The pulse generator 45 shapes the input signal from the gating circuit 46 to a pulse of determined amplitude and time duration. The time duration of this pulse may be fixed as predetermined by the speed with which the articles are to be counted and the minimal separation distance between the articles. As previously-mentioned, a principle object of the present invention is to eliminate the need for separating items before counting. Thus, it is only necessary that the magnetic field of the magnetic labels be separated by a distance determined by the time duration of the pulse produced in the stage 45, and not by the physical sizes of the articles, themselves. Since the magnets are of known strength and are extremely small, the likelihood of having two units pass the detector stage 40 at precisely the same instant of time is extremely remote. In the event that this does occur, additional threshold detectors 47 may be utilized to discriminate against such events and to provide a corresponding output signal indicating occurrence.

The output of the pulse generator 45 is applied to a conventional counter device 48 which may be provided with a conventional display unit 49. The output of the counter 48 may also be used to supply total or partial count information to a variety of output devices, such as a paper tape punch device 50, a magnetic tape unit 51 for interfacing with subsequent data processing equipment, or a printer 52 for permanent storage and immediate retrieval of the count. As will be readily understood, devices such as the tape punch device 50, the magnetic tape unit 51, and the printer 52 are well-known items and are adapted, in a conventional manner, to be operated by a conventional counter such as the counter 48, to achieve the desired particular output function.

As above-mentioned, in operating the system, articles with permanent magnets attached thereto are placed in the hopper 31 at the input station of the conveyor system. From this point the articles are moved randomly by the belts 13 and 23 through the compression section. The size or field strength of the permanent magnets employed is determined mainly by the size of the articles to be counted and the desired resolution. Before the items 32 enter the compression portion of the conveyor system they are partially separated by the leveling device 33 which tends to level the random accumulation of the articles traveling therepast. The separator device 33 is necessary to prevent blockage of the unit when running at relatively high speed, namely, to prevent a large bundle of articles 32 from passing through the compression section simultaneously. The space provided in the compression chamber portion of the machine made large enough to accommodate the largest bundles released by the action of the separator device 33. The degree of separation is determined mainly by the speed of the conveyor belts 13 and 23.

Due to the fact that the belts 13 and 23 are in constant motion while articles are fed from the hopper 31, the separation between the articles will ordinarily be sufficient and further separation with a separator means is ordinarily not necessary. In general, a bundle of clothing, towels, diapers, or the like, may contain, at most, three or four articles rolled together, and the compression section of the machine is made large enough to handle such a bundle without jamming. The separator device 33, therefore, acts mainly to separate one small bundle from another and to ensure that the system will not become jammed. It is not the purpose of the separator device 33 to separate articles or bundles into individual components.

The articles 32, after passing the separator device 33, are moved to the compression section by the conveyor belts, where they enter a state of gradual compression until they reach their maximum compression level. They are held in the compressed state between the parallel portions of the plate members 22 and 17 until they pass substantially beyond the detector section 40. Since both the upper and lower belts move at the same, or substantially the same velocity, being driven from a common pulley, the articles are conveyed past the detector section 40 at constant velocity without tumbling or rolling.

After all the articles have passed the detector section 40, they are discharged from the conveyor mechanism into the receiving container 34. Once deposited in the container 34, all the articles are considered to have been counted and the system is ready to accept the next lot.

As above-mentioned, while the articles pass the detection coils 37, 37' of FIG. 1, said articles are in the compression chamber portion of the machine.

In a typical form of the invention, the coils 37 and 37' are fabricated, using .02-inch thick laminations of Hypernom, as manufactured by the Westinghouse Corporation, as a core, around which are wound a sufficient number of turns of copper wire. Thus, in the example of coil construction illustrated in FIG. 5, the core laminations are shown at 53 and the copper coil turns are shown at 54. The number of turns is determined by the sensitivity desired in the system and the depth of the compression section. One or more detector coils 37 may be located at the top portion of the compression section, and similarly, one or more detector coils 37' may be located at the bottom portion of the compression section. The number of detector coils employed is determined by the transverse width of the conveyor. A conveyor assembly 2 inches wide may use 2-inch wide detector coils 37 and 37', or two 1-inch wide detector coils 37 and 37', respectively, above and below the conveyor compression section. A conveyor assembly 12 inches in width may use a single detector coil 37 and 37' above and below the compression section, the coils being 12 inches in width, or alternatively, may use six 2-inch units above and below, or 12 1-inch units. The type and width of the detector coils to be employed will be determined mainly by economic factors involved in connection with the fabrication of the coils.

Thus, if the conveyor unit is 12 inches in width, and the compression section 1 inch deep, and the articles 32 are tagged with relatively large permanent magnets, the detector coils 37 and 37' may consist of only a few turns of copper wire surrounding the Hypernom laminations. In such a case, it is probably most desirable to fabricate the coils 37 and 37' in single units 12 inches wide.

If the magnets 36 are small, or if the conveyor compression section is relatively deep, whereby greater detection sensitivity is required, the coils 37 and 37' may comprise many thousand turns of wire. In this case it is probably most economical to employ a plurality of small-width detection coils rather than single wide-coverage detection coils 37 and 37'.

It will thus be seen that in a particular design, a compromise is made, with respect to the detection coils, by considering the depth of the compression chamber, the width of the conveyor, the size of the permanent magnets 36 to be detected, and the desired resolution.

As previously-mentioned, a typical detection probe assembly comprises the two coils 37 and 37', one mounted above and one mounted below the intermediate portion of the compression section of the conveyor assembly. As shown in FIG. 3, they are connected in series and are connected to the input of a single differential amplifier 55, the coils 37, 37' being series-connected in such a manner that 60-cycle power frequencies and other disturbing magnetic fields will represent a common mode signal to the differential amplifier and will, therefore, not be amplified to the same degree as the signal received from the detector coil configuration due to the passage of a magnet, or magnets, 36. A slight linear separation is preferably provided between the axes of the coils 37 and 37' to ensure that a magnet passing between the two detector coils at the precise center between the two gives sufficient output to allow accurate counting. The effective range required of each detector coil is also reduced to one-half the depth of the compression section when using this configuration. Thus, in a complete detection assembly 40 of this type where the coils 37 and 37' are located 2 inches apart, each coil would have a detection range of 1 inch.

As shown in FIG. 5, the portions of the coils which are not exposed to the articles moving on the conveyor are shielded in a casing of Nu-Metal, shown at 56, or of Hypernom, or other high-permeable material to minimize the effects of undesired external magnetic fields. In addition, each coil is surrounded by an internal copper or aluminum foil shield 57 for providing electrostatic field isolation. This is in accordance with the common practice employed in the fabrication of coils or magnet-detection heads to reduce susceptibility to extraneous magnetic and electrostatic fields.

The magnet shields 56 are, of course, apertured at the regions thereof facing the compression chamber and the output of the detector coils 37, 37' is supplied to and amplified by the pre-amplifier 55, as shown in FIG. 3. The pre-amplifier 55 is provided with an appropriate feedback circuit 56' to restrict the band width to the desired detection range and to prevent unwanted or spurious noise impulses from affecting the counting accuracy. The feedback network 56' associated with the pre-amplifier 55 performs the function of a low-pass filter, allowing only frequencies less than the desired upper cut-off frequency to pass. The upper cut-off frequency is determined by the conveyor speed, or the speed with which the magnets 36 pass the detection head assembly 40. Thus, the pre-amplifier 55 becomes the first stage of a band-pass filter, designated generally at 41 in FIG. 2, while, at the same time, performing its normal function of amplification.

From the pre-amplifier 55 the detected signal is passed on to the main amplifier 57. The feed-back network 58 and the input network 59 associated with main amplifier 57 are designed to give high-pass filtering of the detected signal. In other words, these elements prevent signals of lower frequency than a predetermined value from passing the amplifier system and allow only higher-frequency components to pass. Again, the lower cut-off frequency is determined, in part, by the speed of the conveyor, or the speed with which the magnetic elements 36 pass the detection head assembly 40. Both the upper and lower cut-off frequencies are predetermined, knowing the conveyor speed and the size of the magnets 36. Thus, the band-pass filter, designated schematically at 41 in FIG. 2, is defined by the designed characteristics of the two stages of amplification comprising amplifier 55 and amplifier 57. The amplification is centered around the frequency of interest. The circuits employed in connection with the amplifiers are conventional and well-known to those skilled in the art.

From the above it will be seen that the amplification of the desired signal is provided and the amplified signal is available at the output of the amplifier 57, substantially free of influences from the outside environment and substantially free of low-frequency and high-frequency variations or disturbances that do not contribute significantly to the desired signal intelligence.

From the amplifier 57, of FIG. 3, the signal is passed on to the level detector circuit 44. This circuit establishes the voltage level above which all signals are considered as a magnet passage. This circuit reduces the systems susceptibility to noise commonly found in amplifiers, such as flicker noise, Johnson noise, etc. In addition, it establishes a pre-set level which discriminates against unwanted detector noise. It sets the threshold above which a count is registered, or a magnet is counted. The level detector 44 supplies an output signal to a pulse-forming or generating circuit 45, consisting of an additional operational amplifier 60 with an appropriate feedback network for pulse formation. The output of this circuit is a pulse of constant length regardless of input amplitude or duration.

The output of the pulse-forming circuit 45 of FIG. 3 is applied to a conventional counting unit 48 where each individual impulse represents the passage of a magnet 36 through the detector coil assembly 40.

The circuit of FIG. 3 is used strictly to record the disturbance created by the passage of a magnet, or magnets, 36 through the detector head assembly 40. Each magnet will provide a slightly different response in accordance with its orientation as it passes through the detector head assembly 40, and there will be definite variations in the signals thus produced.

Where greater resolution is required, or where it is desirable to classify articles into various categories, additional detectors and circuits, as discussed above, may be used, such additional detector circuits being partially illustrated in the block diagram of FIG. 2, which includes the upper threshold detector 43 with its inhibiting action on a gating circuit 46, as well as the additional threshold detector 47.

A more sophisticated circuit can be used when it is desirable to classify magnets or articles according to size. Increasing the size and strength of the magnets will cause corresponding increases in output from the detector. It is, therefore, possible to discriminate against smaller magnets, for example, by corresponding simple readjustments of circuit perameters.

FIG. 4 illustrates a typical circuit which may be employed for determining magnet size, strength, or the like. All elements associated with the circuit of FIG. 4 are the same, as previously described, up to the level detectors, namely, the output of the amplifier 42 of FIG. 2. In FIG. 4 there are two level detectors 61 and 62, arranged such that one discriminates against positive levels and the other against negative levels. These circuits can be adjusted to discriminate against levels up to substantially the maximum output capability of the main amplifier.

The outputs of the level detectors 61 and 62 are applied to threshold sensing circuits comprising the respective amplifiers 63 and 64. Thus, amplifier 63 will deliver an output pulse 65 proportional to the duration of the negative pulse passed by the level detector 61, and amplifier 64 will deliver an output pulse 66 proportional to the width of the pulse passed by the positive level detector 62.

By using the circuit of FIG. 4 in conjunction with the circuit of FIG. 3, one can determine the orientation of a magnet as it passes the detector head assembly 40, and in addition, the size and strength of the magnet as related to other magnets being detected by the system. By using the output of the circuit of FIG. 3 as a gating signal into a logical "and" configuration with the outputs of circuit 2, as is diagrammatically illustrated in the block diagram of FIG. 2, an additional degree of noise immunity is achieved.

Integration of the outputs of the circuit of FIG. 4 yields a signal whose amplitude is proportional to the width of the input pulse, which is, of course, proportional to magnet size or strength, assuming that a magnet of greater size and of the same material will have greater strength.

The use of additional level detectors and counters after integration of the outputs of the circuit of FIG. 4 will allow classification of articles according to various other characteristics of interest.

While certain specific embodiments of an improved material counting system utilizing magnetic fields carried by articles to be counted have been disclosed in the foregoing description, it will be understood that various modifications within the spirit of the invention may occur to those skilled in the art. Therefore, it is intended that no limitations be placed on the invention except as defined by the scope of the appended claims.

What is claimed as:

1. An apparatus for counting relatively soft fabric articles wherein the articles are provided with permanently magnetized means carried by the respective articles, said apparatus comprising conveyor means for receiving the articles and moving them along a substantially definite path, magnetic field detection means mounted at a fixed location adjacent and extending transversely across said definite path, signal-forming means operatively connected to said detection means to generate signals responsive to the movement of the respective permanently magnetized means past said fixed location, means to count said signals, wherein said conveyor means comprises a main bottom conveyor belt, means for depositing articles to be counted on said main conveyor belt, article-gripping means spaced a substantial distance rearwardly from said article-depositing means and located above the main belt and extending forwardly adjacent said detection means, said article-gripping means comprising a gripping endless belt, the gripping belt being arranged so that the articles can be received and confined between the main conveyor belt and the gripping endless belt, means to drive the main conveyor belt and the gripping endless belt at substantially the same speed, the main conveyor belt having a substantially horizontal article-supporting surface and the gripping belt having an article-engaging portion above and extending substantially parallel to said article-supporting surface, wherein said magnetic field detection means is located adjacent to and extends substantially completely across the transverse width of the region containing said article-engaging portion, and means to gradually compress the articles together as they move rearwardly away from said article-depositing means and approach the magnetic field detection means, comprising a longitudinally extending bottom run portion on said gripping belt spaced a substantial distance rearwardly from the article-depositing means and converging rearwardly relative to said article-supporting surface and provided with stationary plate-like abutmnet means spaced said substantial distance rearwardly from the article-depositing means and being slidably engaged by said bottom run portion, said rearwardly converging bottom run portion cooperating with said article-supporting surface to compress articles together across said article-engaging region, and hold them against rolling or tumbling in said region as they move rearwardly past the magnetic field detection means.

2. The article-counting apparatus of claim 1 and an article-leveling member extending over said bottom belt and located forwardly of the gripping belt.

3. The article-counting apparatus of claim 1, and wherein said magnetic field detection means comprises a sensing coil and said signal-forming means comprises a pulse-forming circuit connected to said sensing coil.

4. The article-counting apparatus of claim 3, and means to limit the formation of pulses by said pulse-forming circuit only in response to more than a predetermined lower limit level of signal strength induced in said sensing coil.

5. The article-counting apparatus of claim 4, and means to inhibit formation of pulses by said pulse-forming circuit when the signal strength induced in said sensing coil exceeds a predetermined upper limit level.

6. The article-counting apparatus of claim 1, and wherein said magnetic field detection means comprises a plurality of interconnected sensing coils and said signal-forming means comprises a pulse-forming circuit connected to said sensing coils.

References Cited

UNITED STATES PATENTS

| | | | |
|---|---|---|---|
| 1,692,860 | 11/1928 | Petri | 198—165 Y |
| 1,957,222 | 5/1934 | Mershon | 324—41 |
| 3,174,056 | 3/1965 | Leavitt et al. | 324—34 PS |
| 3,199,630 | 8/1965 | Engel et al. | 335—302 |
| 3,423,674 | 1/1969 | Goldsmith et al. | 324—41 |
| 3,468,409 | 9/1969 | Ball | 198—165 |

ROBERT J. CORCORAN, Primary Examiner

U.S. Cl. X.R.

209—111.8; 235—61.11